United States Patent
Yuan

(10) Patent No.: US 11,770,613 B2
(45) Date of Patent: Sep. 26, 2023

(54) ANTI-SHAKE IMAGE PROCESSING METHOD, APPARATUS, ELECTRONIC DEVICE AND STORAGE MEDIUM

(71) Applicant: Black Sesame Technologies Inc., San Jose, CA (US)

(72) Inventor: Zhenwei Yuan, Wuhan (CN)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/829,903

(22) Filed: Jun. 1, 2022

(65) Prior Publication Data
US 2023/0036081 A1 Feb. 2, 2023

(30) Foreign Application Priority Data
Jul. 22, 2021 (CN) .......................... 202110832559.0

(51) Int. Cl.
H04N 23/68 (2023.01)
(52) U.S. Cl.
CPC ......... *H04N 23/683* (2023.01); *H04N 23/689* (2023.01); *H04N 23/6845* (2023.01)
(58) Field of Classification Search
CPC ............. H04N 23/683; H04N 23/6845; H04N 23/689; G06T 5/002; G06T 5/003; G06T 2207/20104; G06T 2207/30244
See application file for complete search history.

(56) References Cited

U.S. PATENT DOCUMENTS

| | | | |
|---|---|---|---|
| 2009/0213234 A1 | 8/2009 | Chen et al. | |
| 2012/0105654 A1 | 5/2012 | Kwatra et al. | |

FOREIGN PATENT DOCUMENTS

| | | |
|---|---|---|
| CN | 101308641 A | 11/2008 |
| CN | 101329767 A | 12/2008 |
| CN | 103810725 A | 5/2014 |
| CN | 105163046 A | 12/2015 |
| CN | 106101535 A | 11/2016 |

(Continued)

OTHER PUBLICATIONS

CN 111147741 Translation (Year: 2020).*

(Continued)

*Primary Examiner* — Twyler L Haskins
*Assistant Examiner* — Angel L Garces-Rivera
(74) *Attorney, Agent, or Firm* — Timothy Wang; Ni, Wang & Massand, PLLC

(57) ABSTRACT

An anti-shake image processing method, apparatus, electronic device and storage medium are disclosed. The method includes the following steps. A current actual posture of an imaging device at a current shooting moment of capturing an original image of current frame and multiple reference actual postures of the imaging device at multiple shooting moments of capturing the original images of adjacent multiple frames of the original image of the current frame are obtained. A path smoothing process is performed to determine a current virtual posture after path smoothing at the current shooting moment. A coordinate transformation is performed on the original image of the current frame captured in the current actual posture to an estimated position of the original image of the current frame when captured in the current virtual posture in a pixel coordinate system to obtain a first correction image of the current frame.

11 Claims, 12 Drawing Sheets

(56) References Cited

FOREIGN PATENT DOCUMENTS

| CN | 106507094 A | 3/2017 |
| --- | --- | --- |
| CN | 106851102 A | 6/2017 |
| CN | 108234859 A | 6/2018 |
| CN | 108462838 A | 8/2018 |
| CN | 110660090 A | 1/2020 |
| CN | 110753181 A | 2/2020 |
| CN | 111147741 A | 5/2020 |
| CN | 111372000 A | 7/2020 |
| CN | 112509047 A | 3/2021 |
| CN | 112734659 A | 4/2021 |
| CN | 113066050 A | 7/2021 |
| WO | 2018120735 A1 | 7/2018 |

OTHER PUBLICATIONS

Nongwu Li, Research on Video Stabilization Technology, Feb. 15, 2015, China Excellent Doctoral and Master's Thesis Database (Master) Information Technology Series.

M. Mohan M.R. et al., Going Unconstrained with Rolling Shutter Deblurring, Dec. 25, 2017, 2017 IEEE International Conference on Computer Vision.

* cited by examiner

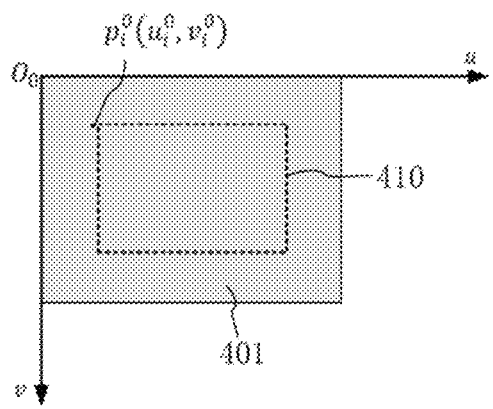
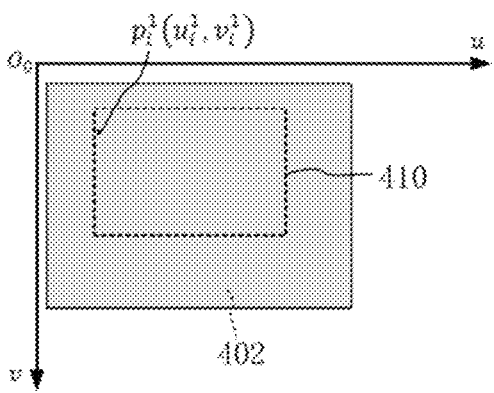
FIG.4A          FIG.4B
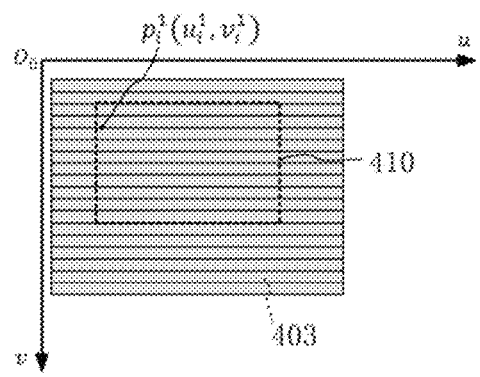
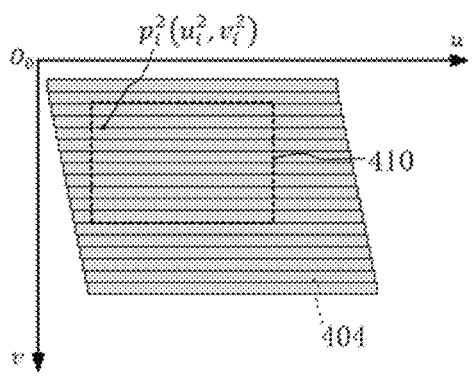
FIG.4C          FIG.4D
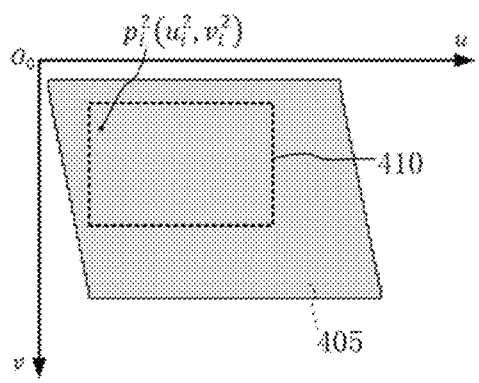
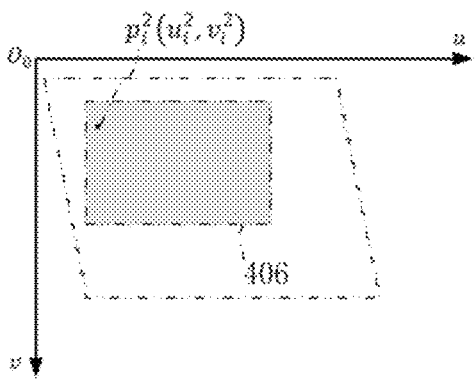
FIG.4E          FIG.4F

ANTI-SHAKE IMAGE PROCESSING METHOD, APPARATUS, ELECTRONIC DEVICE AND STORAGE MEDIUM

CROSS REFERENCE TO RELATED APPLICATION

This patent application claims the benefit and priority of Chinese Patent Application No. CN 202110832559.0 filed on Jul. 22, 2021, the disclosure of which is incorporated by reference herein in its entirety as part of the present application.

TECHNICAL FIELD

The disclosure relates to the technical field of image processing, and more specifically, to an anti-shake image processing method, an apparatus, an electronic device and a storage medium.

BACKGROUND ART

In daily life, mobile electronic devices, such as hand-held, wearable or on-board, inevitably lead to bad conditions, such as blurring of the captured video image due to the jitter of the electronic device, resulting in poor appearance of the display screen of the captured video, and even affect the subsequent analysis and recognition of the video image. In order to reduce or eliminate the impact of electronic device jitter on the captured video, many video anti-shake technologies have been developed.

At present, the mainstream video anti-shake technology can be divided into mechanical anti-shake, optical anti-shake, electronic anti-shake and digital anti-shake. Mechanical anti-shake improves the shooting effect by erecting the shooting device on the stable PTZ, such as the handheld PTZ commonly used for outdoor shooting. Although the technical effect is remarkable, the PTZ device is generally expensive, so it is usually only used in the professional photography field. Optical anti-shake can compensate the optical path with jitter through the built-in movable components of electronic device, such as micro pan tilt, so as to reduce the blur caused by jitter in the shooting image. This anti-shake technology has stable effect, but it also needs the support of device hardware, so the cost is high. Digital anti-shake can only use digital image processing technology to operate the collected image sequence, and realize anti-shake through image feature matching, motion information extraction and image transformation. However, image feature matching is limited by the image content. For the scene with clear shooting and small motion range, better processing results may be obtained. Once the image content is single and the image is fuzzy, the matching is prone to errors, resulting in poor processing effect. Therefore, this technology has the defect of low stability.

At present, there is still a need to improve video anti-shake technology in the field.

SUMMARY

In view of the above, it is necessary to provide an anti-shake image processing method, apparatus, electronic device and storage medium that can reduce the impact of imaging device shake on the captured video image at low cost and efficiently.

A first aspect of the disclosure is to provide an anti-shake image processing method, including the steps as follows.

A current actual posture of an imaging device at a current shooting moment of capturing an original image of a current frame is obtained. Multiple reference actual postures of the imaging device at multiple shooting moments of capturing the original images of adjacent multiple frames of the original image of the current frame are obtained.

A path smoothing process is performed based on the current actual posture and the multiple reference actual postures to determine a current virtual posture after path smoothing at the current shooting moment.

A coordinate transformation is performed on the original image of the current frame captured in the current actual posture to an estimated position of the original image of the current frame when captured in the current virtual posture in a pixel coordinate system to obtain a first correction image of the current frame.

A result image of the current frame is determined based on the first correction image of the current frame.

A second aspect of the disclosure is to provide an anti-shake image processing apparatus, including the modules as follows.

A posture obtaining module is configured to obtain a current actual posture of an imaging device at a current shooting moment of capturing original image of a current frame, and multiple reference actual postures of the imaging device at multiple shooting moments of capturing the original images of multiple adjacent frames of the original image of the current frame.

A path smoothing module is configured to perform a path smoothing process based on the current actual posture and the multiple reference actual postures to determine a current virtual posture after path smoothing at the current shooting moment.

A first image correction module is configured to perform a coordinate transformation on the original image of the current frame captured in the current actual posture to an estimated position of the original image of the current frame when captured in the current virtual posture in a pixel coordinate system to obtain a first correction image of the current frame.

A first result image determining module is configured to determine a result image of the current frame based on the first correction image of the current frame.

A third aspect of the disclosure is to provide an electronic device, including a memory on which a computer program is stored and a processor. The processor, when executing the computer program, implements the steps as follows.

A current actual posture of an imaging device at a current shooting moment of capturing an original image of a current frame is obtained. Multiple reference actual postures of the imaging device at multiple shooting moments of capturing the original images of adjacent multiple frames of the original image of the current frame are obtained.

A path smoothing process is performed based on the current actual posture and the multiple reference actual postures to determine a current virtual posture after path smoothing at the current shooting moment.

A coordinate transformation is performed on the original image of the current frame captured in the current actual posture to an estimated position of the original image of the current frame when captured in the current virtual posture in a pixel coordinate system to obtain a first correction image of the current frame.

A result image of the current frame is determined based on the first correction image of the current frame.

A fourth aspect of the disclosure is to provide a computer readable storage medium having stored thereon a computer program. The computer program, when executed by a processor, implements the steps as follows.

A current actual posture of an imaging device at a current shooting moment of capturing an original image of a current frame is obtained. Multiple reference actual postures of the imaging device at multiple shooting moments of capturing the original images of adjacent multiple frames of the original image of the current frame are obtained.

A path smoothing process is performed based on the current actual posture and the multiple reference actual postures to determine a current virtual posture after path smoothing at the current shooting moment.

A coordinate transformation is performed on the original image of the current frame captured in the current actual posture to an estimated position of the original image of the current frame when captured in the current virtual posture in a pixel coordinate system to obtain a first correction image of the current frame.

A result image of the current frame is determined based on the first correction image of the current fame.

The above anti-shake image processing method, apparatus, electronic device and storage medium use the internal sensor of the device to obtain the actual posture of the device, then smoothly compensate the actual posture of the device to obtain the virtual posture, and correct the photographed original image to the smoothly compensated virtual posture, so as to achieve the purpose of making the photographed image stable. It has the advantages of low cost, high efficiency and stable correction effect.

BRIEF DESCRIPTION OF THE DRAWINGS

FIGS. 4A-4F are schematic diagrams of the change from the original image to the result image during the execution of the anti-shake image processing method in one embodiment.

DETAILED DESCRIPTION OF THE EMBODIMENTS

In order to make the purpose, technical scheme and advantages of the disclosure clearer, the disclosure is further described in detail below in combination with the attached drawings and embodiments. It should be understood that the specific embodiments described herein are only used to explain the disclosure and are not used to limit the disclosure.

The disclosure provides an anti-shake image processing method, which can use the internal sensor of the mobile device to obtain the motion posture of the device, so as to carry out anti-shake correction processing on the captured image according to the motion posture, and has the advantages of high precision, low cost and stable operation.

Figure 1:
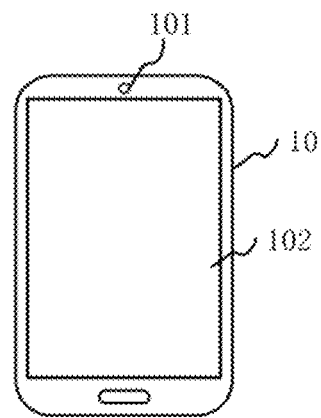
FIG. 1 is a schematic diagram of the electronic device in one embodiment.

The anti-shake image processing method provided by the disclosure can be applied to the electronic device 10 shown in FIG. 1. The electronic device 10 includes but is not limited to various smart phones, digital cameras, personal computers, laptops, tablets, etc. The electronic device 10 can be loaded with a camera 101, and the electronic device 10 can capture video data in real time through the camera 101, or store the previously captured video data at the local end. Alternatively, the electronic device 10 may obtain video data from other external devices via wired or wireless communication and then store it at the local end. The video data includes multiple consecutive frames of original images arranged according to the shooting timing. The electronic device 10 can perform the anti-shake image processing method of the embodiment of the present disclosure on each frame of the original image captured in real time or stored in the video data at the local end, correct each frame of the original image in the video data, so as to reduce or eliminate the adverse impact on the captured image due to the jitter of the imaging device capturing the video data during the shouting process, and obtain the corrected result image. The electronic device 10 can also be loaded with a display screen 102, so that the electronic device 10 can display the corrected result image on the display screen 102 for the user to view.

Figure 2:
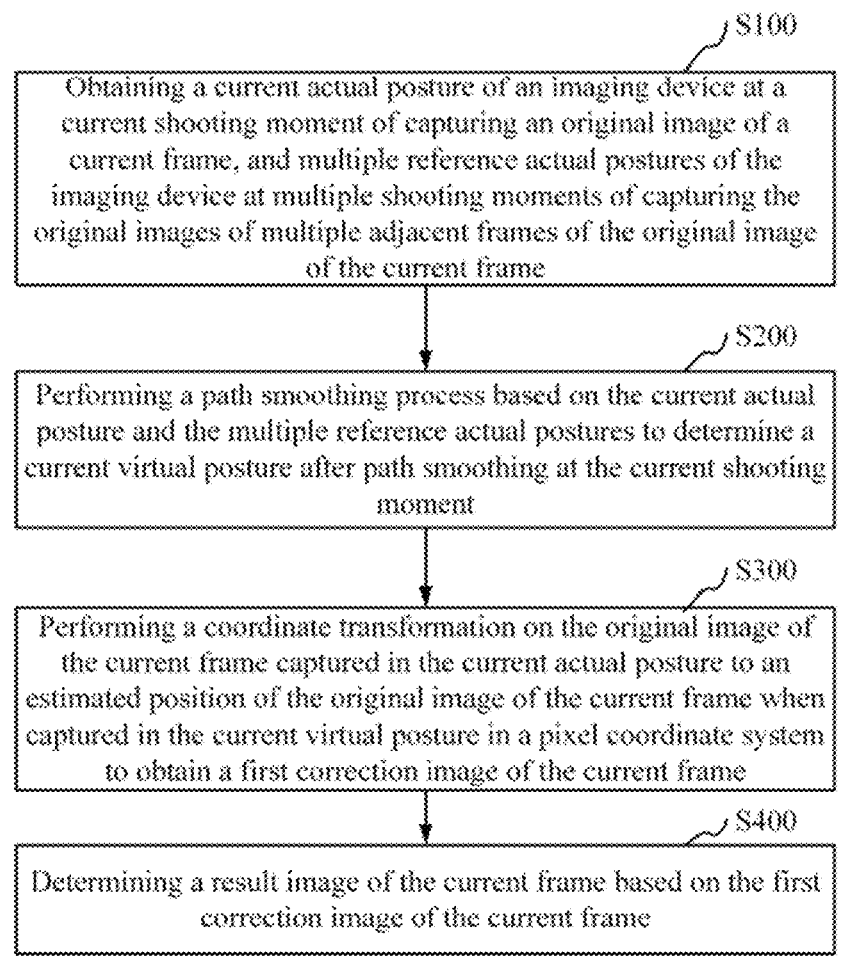
FIG. 2 is a flowchart of the anti-shake image processing method in one embodiment.

In one embodiment, as shown in FIG. 2, an anti-shake image processing, method is provided. Taking the execution of the method by the electronic device 10 in FIG. 1 as an example, it includes the following steps S100-S400.

S100: obtaining a current actual posture of an imaging device at a current shooting moment of capturing an original image of a current frame, and multiple reference actual postures of the imaging device at multiple shooting moments of capturing the original images of multiple adjacent frames of the original image of the current frame.

It can be understood that the original image described in the embodiments of the present disclosure not necessarily the original shot unprocessed image, but in addition to the unprocessed original image, it can also be a representative image or representative data that can represent the information of the original image obtained based on the unprocessed original image after processing, such as resolution transformation, cutting, feature extraction, etc. For example, as will be mentioned in subsequent embodiments, in order to improve the efficiency of image processing, the original image grid generated based on the original image can be used to replace the original image to perform subsequent image processing, and after obtaining the result image grid corresponding to the result image, the result image grid and the original image can be combined to generate the final result image.

The imaging device of the embodiments of the present disclosure refers to a device for capturing video. When the video is captured by the electronic device 10 itself, the imaging device refers to the electronic device 10. When the video is captured by an external device other than the electronic device 10, the imaging device refers to the external device.

In this step, the actual posture during imaging the original image can be obtained through the G-sensor or gyro-sensor of the imaging device. When the imaging device captures multiple consecutive frames of original images at a predetermined frame rate at multiple shooting moments, the built-in G-sensor of the imaging device further collects the actual posture at multiple collection moments according to the predetermined collection rate. However, the collection moment and the shooting moment are often not completely aligned. Therefore, for the shooting moment of each frame of the original image, the actual posture at the shooting moment can be estimated according to the actual posture at one, two or more collection moments close to the shooting moment.

The actual posture $P_r(t)$ of each shooting moment t obtained by the G-sensor or gyroscope sensor can be expressed by Euler angles (X, Y, Z), where X, Y and Z respectively are the pitch angle (that is, the rotation angle of the imaging device around the X axis of the world coordinate system or the object coordinate system of the imaging device), yaw angle (that is, the rotation angle of the imaging device around the Y axis of the world coordinate system or the object coordinate system) and row angle (that is, the rotation angle of the imaging device around the of the world coordinate system or the object coordinate system).

In order to avoid the problem of universal joint deadlock in subsequent calculations, the Euler angle (X, Y, Z) can be transformed to quaternion (w, X, Y, Z), where:

$$\begin{cases} w = \cos\left(\frac{Y}{2}\right)\cos\left(\frac{Z}{2}\right)\cos\left(\frac{X}{2}\right) + \sin\left(\frac{Y}{2}\right)\sin\left(\frac{Z}{2}\right)\sin\left(\frac{X}{2}\right) \\ x = \sin\left(\frac{Y}{2}\right)\sin\left(\frac{Z}{2}\right)\cos\left(\frac{X}{2}\right) + \cos\left(\frac{Y}{2}\right)\cos\left(\frac{Z}{2}\right)\sin\left(\frac{X}{2}\right) \\ y = \sin\left(\frac{Y}{2}\right)\cos\left(\frac{Z}{2}\right)\cos\left(\frac{X}{2}\right) + \cos\left(\frac{Y}{2}\right)\sin\left(\frac{Z}{2}\right)\sin\left(\frac{X}{2}\right) \\ z = \cos\left(\frac{Y}{2}\right)\sin\left(\frac{Z}{2}\right)\cos\left(\frac{X}{2}\right) + \sin\left(\frac{Y}{2}\right)\cos\left(\frac{Z}{2}\right)\sin\left(\frac{X}{2}\right) \end{cases}$$

Step S200: performing a path smoothing process based on the current actual posture and the multiple reference actual postures to determine a current virtual posture after path smoothing at the current shooting moment.

The actual posture $P_r(t)$ of the imaging, device at each shooting moment t constitutes a posture path, and the camera shake makes the posture path unsmooth. In order to smooth the posture path, a corresponding frame caching pool $\Omega_t$ can be established tot the current moment t. The frame caching pool is used to store the actual posture of the current shooting moment t (current actual posture), p virtual and/or actual postures (reference virtual postures and/or reference actual postures) of p previous shooting moments before the current shooting moment, and q actual postures (reference actual postures) at the q later shooting moments after the current shooting moment, so as to facilitate the path smoothing process by using the current actual postures and multiple reference actual postures in the frame caching pool, so as to determine the current virtual posture $P_v(t)$ corresponding to the current shooting moment t in the virtual path after path smoothing.

Among them, the value of p or q can be set reasonably according to the actual demand, for example, it can be about 15~30. It can be understood that the greater the value of p or q, the higher the smoothing intensity may be and the more computing resources will be occupied accordingly.

The scheme of the disclosure can perform real-time processing while the imaging device captures the video, or can also perform non-real-time processing on the captured video data.

In the case of teal-time processing, generally, the frame caching pool $\Omega_t$ can only store the current actual posture of the current shooting moment t, and the p reference actual postures and/or reference virtual postures of the p previous shooting moments before the current shooting moment t, but the actual posture of the later shooting moment after the current shooting filament t may not be obtained. In this case, the following first optimization objective function $O_1(P_v(t))$ can be established:

$$O_1(P_v(t)) = \Sigma_t(\|P_r(t)-P_v(t)\|^2 + \lambda_t \Sigma_{r \in \Omega_t, r<t} w_r \|P_v(t)-P_v(r)\|^2)$$

In the case of non-real-time processing, the frame caching pool $\Omega_t$ can store the actual posture of the current shooting moment t, the reference virtual postures and/or reference actual postures of p previous shooting moments before the current shooting moment t, and the reference actual postures of q later shooting moments after the current shooting moment. In this case, the following second optimization objective function $O_2(P_v(t))$ can be established:

$$O_2(P_v(t)) = \Sigma_t(\|P_r(t)-P_v(t)\|^2 + \lambda_t \Sigma_{r \in \Omega_t, t<t} w_r \|P_v(t)-P_v(r)\|^2 + \lambda'_t \Sigma_{r \in \Omega_t, r \geq t} w'_r \|P_v(t)-P_r(r)\|^2)$$

Where, r is the moment r, $\lambda_t$, $\lambda'_t$, $w_r$, $w'_r$ are smoothing parameters. The initial default value of $\lambda_t$, $\lambda'_t$ can be set according to actual needs. For example, $\lambda_t$ and $\lambda'_t$ can be initialized to 1. $w_r$, $w'_r$ are the weights of r at each moment. For example, $w_r$, $w'_r$ can adopt Gaussian weight.

According to the first optimization objective function $O_1(P_v(t))$, the first optimization formula can be established, and the optimization objective is to minimize $O_1(P_v(t))$. Similarly, the second optimization formula can be established according to the above second optimization objective function $O_2(P_v(t))$, and the optimization objective is to minimize $O_2(P_v(t))$. The first optimization formula or the second optimization formula can be solved by Jacobi iterative method, so as to obtain the current virtual posture $P_v(t)$ of the current shooting moment t after path smoothing.

The first term on the right side of the equations of the first optimization objective function and the second optimization objective function is to ensure that the virtual posture is close to the actual posture, that is, the following of the motion, and the second term is to ensure that the virtual posture at the current shooting moment t is close to the virtual posture at the previous shooting moment r<t, that is, the stability of the motion. The function of the third term on the right side of the second optimization objective function equation is to ensure that the virtual posture at moment t is close to the actual posture at the later shooting moment r>t, that is, the stability of motion. By adjusting the values of smoothing parameter $\lambda_t$ ($\lambda'_t$), the balance between the first term and the second term (and the third term) can be controlled, that is, a reasonable choice can be made between the following performance and stability of the motion.

Thus, for real-time processing, the actual posture $P_r(t)$ at shooting moment t is smoothed by using the posture information ( . . . $P_v(t-2)$, $P_v(t-1)$, $P_r(t)$) before shooting moment t to obtain a smooth virtual posture $P_v(t)$. For non-real-time processing, the actual posture of shooting time t can be smoothed by using the posture information ($P_r(t+1)$, $P_r(t+2)$, . . . ) before shooting time t and after shooting time t to obtain a smooth virtual posture $P_v(t)$.

Figure 3:
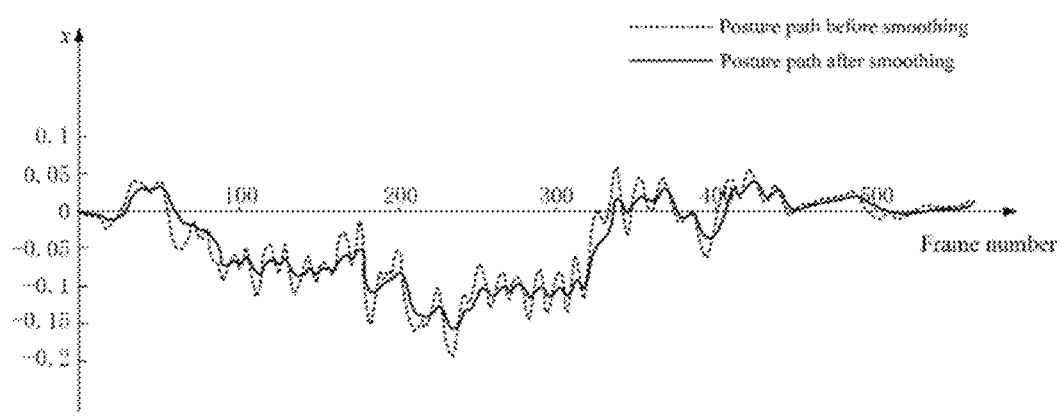
FIG. 3 is a schematic diagram of the posture path before and after the path smoothing process in one embodiment.

FIG. 3 is an example of performing path smoothing process. The abscissa represents the number of frames of the original image, the ordinate represents the x term of the quaternion, the dotted line represents the posture path before smoothing, and the solid line represents the posture path after smoothing. It can be understood that FIG. 3 only shows the smoothing processing of the x term of the quaternion, but in fact, the above path smoothing process smooths the four terms of the quaternion. A similar schematic diagram can also be shown with the quaternion y, z and z terms as the ordinate and the number of frames as the abscissa.

Step S300: performing a coordinate transformation on the original image of the current frame captured in the current actual posture to an estimated position of the original image of the current frame when captured in the current virtual posture in a pixel coordinate system to obtain a first correction image of the current frame.

Through step S200, the virtual posture of each shooting moment Icon be obtained. In order to make the display image of the video more stable and reduce the influence of shake on the image, each pixel in each frame of the original image can be transformed from the pixel coordinate where the pixel is photographed in the actual posture $P_r(t)$ to the pixel coordinate where the pixel should be photographed in its virtual posture $P_v(t)$ in the pixel coordinate system.

The pixel coordinate system is a coordinate system that represents the position of each pixel in the image. Referring to FIG. 4A, for example, the pixel coordinate system in the imaging device may be a rectangular coordinate system u-v established in pixels with the upper left corner of the original image 401 taken by the imaging device as the origin, and the abscissa u and ordinate v of the pixel represent the number of columns and rows of the pixel in the image respectively. FIG. 4A shows that the coordinates of a pixel point $p_i$ in the original image 401 in the pixel coordinate system are $p_i^0$ ($u_i^0$, $v_i^0$).

The transformation between postures can be expressed by quaternion operation. As shown in the following formula, quaternion T represents the transformation from actual posture $P_r(t)$ to virtual posture $P_v(t)$.

$$T = P_r(t) \cdot P_v(t)^{-1} = (w_T, x_T, y_T, z_T)$$

In order to apply the transformation of quaternion T to the transformation of pixel coordinates of each pixel in the corresponding image, quaternion T can be transformed into rotation matrix $M_R$, as shown in the following formula:

$$M_R = \begin{bmatrix} 1-2y_T^2-2z_T^2 & 2x_Ty_T-2z_Tw_T & 2x_Ty_T+2y_Tw_T \\ 2x_Ty_T+2z_Tw_T & 1-2x_T^2-2z_T^2 & 2y_Tz_T-2x_Tw_T \\ 2x_Tz-2y_Tw_T & 2y_Tz_T+2x_Tw_T & 1-2x_T^2-2y_T^2 \end{bmatrix}$$

Then the homograph transformation matrix $M_T$ of the image is calculated according to the rotation matrix $M_R$, as shown in the following formula:

$$M_T = M_K \cdot M_K^{-1}$$

Where, $M_K$ is the camera internal parameter matrix, which can be obtained by calibrating the camera taking the original image.

Using the matrix $M_T$, the original pixel coordinates (u, v) of each pixel in the original image can be transformed into the transformed pixel coordinates (u', v'), as shown in the following formula, so as to obtain the first correction image after coordinate transformation.

$$\begin{bmatrix} u' \\ v' \\ 1 \end{bmatrix} = M_T \begin{bmatrix} u \\ v \\ 1 \end{bmatrix}$$

As shown in FIG. 4B, when the current virtual posture is not equal to the current actual posture, after the coordinate transformation in this step, the obtained first correction image 402 is offset relative to the original image 401 in the pixel coordinate system, and the pixel coordinates of the pixel point $p_i$ in the first correction image 402 are transformed into $p_i^1(u_i^1, v_i^1)$.

Step S400: determining a result image of the current frame based on the first correction image of the current frame.

In one embodiment, step S400 may include step S410 and step S420.

Step S410: determining a correction image of the current frame based on the first correction image of the current frame.

The scheme of the disclosure can be applied to the video taken by the global shutter mode, or the video taken by the rolling shutter mode. After determining the first correction image of the current frame, the video taken in different modes can have different subsequent processing, methods.

Figure 5:
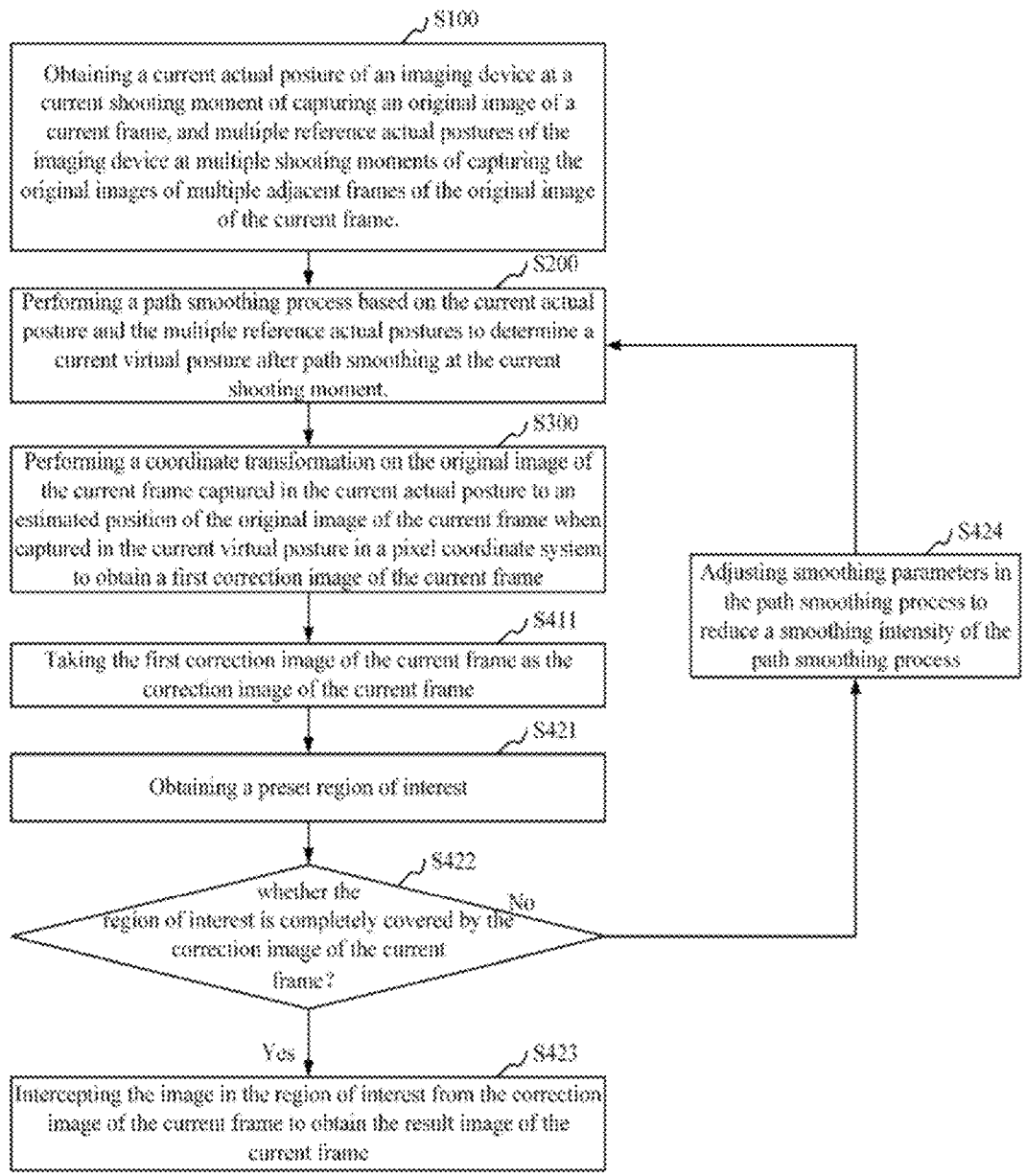
FIG. 5 is a flowchart of the anti-shake image processing method in one embodiment.

In one embodiment, as shown in FIG. 5, when the original image of the current frame is captured by the imaging device in the global shutter mode, step S410 includes step S411: taking the first correction image of the current frame as the correction image of the current frame.

The global shutter mode is realized by exposing the whole scene at the same time. All pixels of the image sensor collect light at the same time and expose at the same time. There is no need to perform the step of eliminating the rolling shutter effect. Therefore, the first correction image of the current frame can be directly regarded as the correction image of the current frame.

Figure 6:
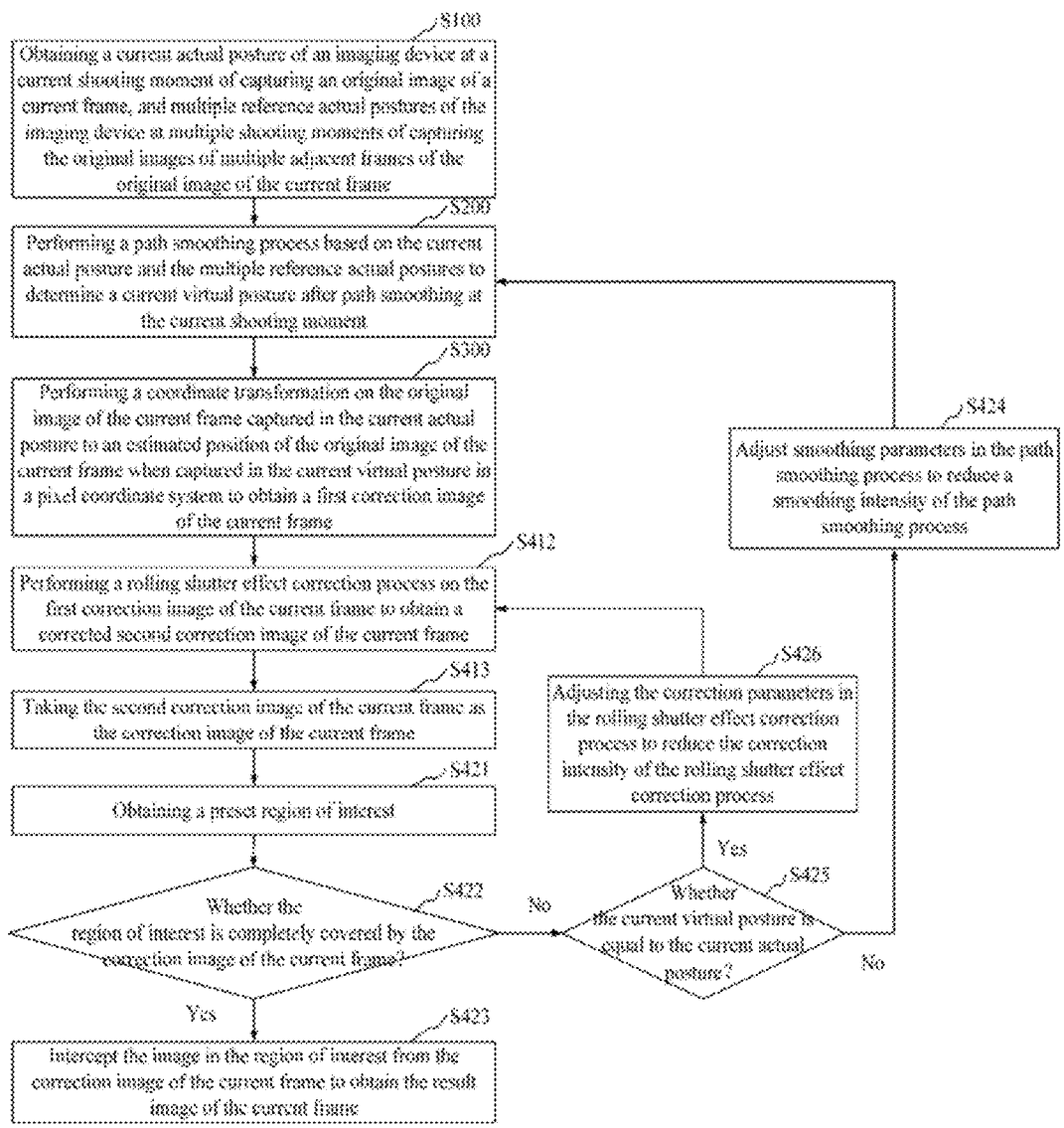
FIG. 6 is a flowchart of the anti-shake image processing method in one embodiment.

In another embodiment, as shown in FIG. 6, when the original image of the current frame is captured by the imaging device in the rolling shutter mode, step S410 includes steps S412-S413. Step S412: performing a rolling shutter effect correction process on the first correction image of the current frame to obtain a corrected second correction image off the current frame. Step S413: taking the second correction image of the current frame as the correction image of the current frame.

Complementary metal oxide semiconductor (CMOS) cameras generally take images by rolling shutter mode. The rolling shutter mode is realized by exposing each row of pixel points of the image sensor row by row. At the beginning of exposure, the pixels of the image sensor are scanned row by row and exposed row by row until all pixels are exposed. Therefore, when the shaking frequency of imaging device is high during shooting, it often produces the effect of image content distortion, which is called rolling shutter effect, or RS effect for short. Therefore, after the first correction image of the current frame is obtained, for the image taken in the was of the roller shutter mode, the rolling shutter effect correction process can be additionally performed to reduce the influence of the rolling shutter effect on the image.

Further, the disclosure further proposes to use the smoothed virtual posture to correct the rolling shutter effect of the image. In one embodiment, step S412 includes steps S4121-S4124.

S4121: dividing the first correction image of the current frame into multiple sub image bars parallel to a scanning pixel row of the rolling shutter.

As shown in FIG. 4C, when the roller shutter scans pixels row by row in the pixel row direction parallel to the u-axis, the exposure time of each pixel in the same pixel row parallel to the u-axis is the same, and the exposure time of pixels between different pixel rows is different. In this step, the first correction image can be divided into m sub image bars, and the pixel length direction of each sub image bar is parallel to the u-axis. The pixel width h of each sub image bar can be set according to the actual situation. For example, h can be set to 8 or 16 pixels. When the total pixel height of the image in the v-axis direction is H, generally h=H/m.

In the FIG. 4C, the first correction image 402 is divided into multiple sub image bars 403.

S4122: obtaining multiple sub image actual postures of the imaging device when imaging multiple corresponding imaging moments of the multiple sub image bars.

The roller shutter of the imaging device has a fixed scanning period Ts for scanning each frame of the original image, which is the time required from scanning the first row of pixels in the original image of a frame to completing the scanning of the last row of pixels in the original image of the frame. The electronic device 10 can obtain the time stamp t of the original image of the current frame, which can generally be used as the shooting moment of the original image of the current frame described above. The time stamp t generally the time when the pixels in the first row are scanned. Because the refresh rate of G-sensor/gyro-sensor is generally very high, the scanning time of one frame of original image may include many frames of posture data of G-sensor/gyro-sensor. Then the imaging time $t_j$ of each sub image bars can be calculated by the following: expression:

$$t_j = t + (j-1) \times \frac{k}{m}$$

Where, j represents the j-th sub image bar, 1≤j≤m, and k is the correction parameters of rolling shutter effect correction process. When step S412 is performed for the first time for each frame of the original image, the correction parameter k of the rolling shutter effect correction process can be initialized to Ts.

After obtaining the imaging moment $t_j$, one or more posture data sampling moments closest to $t_j$ can be found in the posture data stream of the G-sensor/gyro-sensor. According to the posture data at these sampling moments, the actual posture P'$_r$($t_j$) of the sub image at the imaging moment $t_j$ can be estimated by linear interpolation.

Step S4123: performing a coordinate transformation on the multiple sub image bars captured in the multiple sub image actual postures to the estimated position of the plurality of sub image bars when captured in the current virtual posture in the pixel coordinate system to obtain multiple correction sub image bars.

In this step, the sub image actual posture P'$_r$($t_j$) can be transformed into the corresponding quaternion form P'$_r$(t), and then each pixel in each sub image bar can be transformed from the pixel coordinate where the pixel is photographed in the sub image actual posture P'$_r$($t_j$) to the pixel coordinate where the pixel should be photographed in its virtual posture P$_v$(t) by using the posture transformation method similar to that in step S200. When the time stamp t is the time of scanning the pixels in the first row, the sub image actual posture P'$_T$($t_j$) of the first sub image bar has been equal to the virtual posture P$_v$(t) when this step is executed. Therefore, the posture transformation of the first sub image bar can be omitted, and only the posture transformation of the remaining sub image bars can be performed.

The following, posture transformation can be performed for each subsequent sub image bar.

As shown in the following formula, the quaternion T' represents the transformation from the sub image actual posture P'$_r$(t) to the virtual posture P$_v$(t).

$$T' = P'_r(t_j) \cdot P_v(t)^{-1} = (w_T, x_T, y_T, z_T)$$

in order to apply the transformation of quaternion T' to the of pixel coordinate transformation of each pixel in the corresponding image, quaternion T' can be transformed into rotation matrix M'$_R$, as shown in the following formula:

$$M'_R = \begin{bmatrix} 1 - 2y_T^2 - 2z_T^2 & 2x_T y_T - 2z_T w_T & 2x_T y_T + 2y_T w_T \\ 2x_T y_T + 2z_T w_T & 1 - 2x_T^2 - 2z_T^2 & 2y_T z_T - 2x_T w_T \\ 2x_T z - 2y_T w_T & 2y_T z_T + 2x_T w_T & 1 - 2x_T^2 - 2y_T^2 \end{bmatrix}$$

Then the homograph transformation matrix M'$_T$ of the image is calculated according to the rotation matrix as shown in the following formula:

$$M'_T = M_K \cdot M'_R \cdot M_K^{-1}$$

Where, M$_K$ is the camera internal parameter matrix, which can be obtained by calibrating the camera that captured the original image.

Using the matrix M'$_T$, the current pixel coordinates (u', v') of each pixel in each sub image bar of each pixel can be transformed into the transformed pixel coordinates (u", v"), as shown in the following formula, so as to obtain the correction sub image bar after coordinate transformation.

$$\begin{bmatrix} u'' \\ v'' \\ 1 \end{bmatrix} = M'_T \begin{bmatrix} u' \\ v' \\ 1 \end{bmatrix}$$

As shown in FIG. 4D, after the coordinate transformation in this step, the obtained multiple correction sub image bars 404 is offset relative to the sub image bars before correction 401 in the pixel coordinate system, and the pixel coordinates of the pixel point p$_i$ in the multiple correction sub image bars 404 are transformed into p$_i^2$(u$_i^2$, v$_i^2$).

Step S4124: combining the multiple correction sub image bars to obtain the corrected second correction image of the current frame.

Referring to FIG. 4E, the second correction image 405 of the current frame can be obtained by combining the multiple correction sub image bars 404.

Step S420: intercepting an image in a region of interest from the correction image of the current frame to determine the result image of the current frame.

After S400 is executed, the position of the correction image of the current frame corrected by the path smoothing process in the pixel coordinate system may have been greatly adjusted, and the image pointed by the adjusted virtual posture has not been photographed. Therefore, a large region without content appears in the image region where the original image is located. The embodiment of the disclosure can also intercept the image in the region of interest from the correction image of the current frame and cut off the edge part to remove the content-free region of the edge and maintain the integrity of the image displayed.

In one embodiment, as shown in FIG. 5 and FIG. 6, whether or not the original image of the current frame is captured by the imaging device in a global shutter mode, step S420 may include, steps S421 to S423.

S421: obtaining a preset region of interest.

The region of interest (ROI) can be preset before performing step S420. The region of interest can be set at a predetermined position in the pixel coordinate system with a predetermined size, which can be set by default by the electronic device or input by the user.

Referring to FIG. 4A-4E, in the pixel coordinate system, the region of interest 410 may be set at the center of the region where the original image is located, and the size of the region of interest 410 may be set to occupy, for example, 60%, 70%, 80% or other sizes of the original image size. In FIG. 4A-4E, the region of interest 410 is rectangular, but the region of interest 410 may further be circular, elliptical, irregular or other shapes.

S422: determining whether the region of interest is completely covered by the correction image of the current frame.

When step S422 determines that the region of interest is completely covered by the correction image of the current frame, step S423 is executed to intercept the image in the region of interest from the correction image of the current frame to obtain the result image of the current frame.

Referring to FIG. 4E, when the region of interest 410 is completely covered by the correction image of the current frame 405, the result image 406 in the region of interest 410 can be intercepted from the correction image of the current frame 405.

When the motion amplitude of the imaging device is large, the content-free region in the correction image of the current frame is easy to appear in the region of interest. If the image continues to be intercepted, the intercepted image may not meet the display requirements. In the present disclosure, when it is recognized that the region without content appears in the region of interest, the image out-of-bounds protection can be performed to ensure that the region of interest is within the correction image of the current frame. The image out-of-bounds protection can be realized by the following embodiments.

In one embodiment, when the original image of the current frame is captured by the imaging device in a global shutter mode, as shown in FIG. 5, step S420 may further include the step as follows.

When step S422 determines that at least part of the region of interest is not covered by the correction image of the current frame, step S424 is executed to adjust smoothing parameters in the path smoothing process to reduce a smoothing intensity of the path smoothing process, and step S200 is returned to.

Specifically, when at least part of the region of interest is not covered by the correction image of the current frame, the values of the smoothing parameters $\lambda_t$ and/or $w_r$ can be appropriately reduced for the first optimization objective function, while the values of one or more of the smoothing parameters $\lambda_t$, $\lambda'_t$, $w_r$ and $w'_r$ can be appropriately reduced for the second optimization objective function, then step S200 is returned to, and the path smoothing process of step S200 is re-performed on the actual posture using the reduced smoothing parameters.

In another embodiment, when the original image of the current frame is captured by the imaging device in the rolling shutter mode, as shown in FIG. 6, step S420 may further include the steps as follows.

When step S422 determines that at least part of the region of interest is not covered by the correction image of the current frame, step S425 to is executed to determine whether the current virtual posture calculated in the recently executed step S200 is equal to the current actual posture.

When step S425 determines that the current virtual posture is not equal to the current actual posture, step S424 is executed to adjust the smoothing parameters in the path smoothing process to reduce the smoothing intensity of the path smoothing process, and step S200 is returned to.

Here, the specific adjustment of the smoothing parameters in step S424 can similarly refer to step S424 of the previous embodiment.

When step S425 determines that the current virtual posture is equal to the current actual posture, step S426 is executed to adjust the correction parameters in the rolling shutter effect correction process to reduce the correction intensity of the rolling shutter effect correction process, and step S412 is returned to.

The greater the difference between the virtual posture calculated in step S200 and the actual posture, the greater the degree of image transformation to be done, and the larger the content-free region in the original image, the easier the content-free region falls into the region of interest. Therefore, when at least part of the region of interest is not covered by the correction image of the current frame, that is, there is a content-free region in the region of interest, in step S424, the path smoothing parameters can be adjusted to reduce the intensity of path smoothing. By continuously adjusting the path smoothing parameters and re-performing the path smoothing process until the current correction image generated by the transformation can completely cover the region of interest, then the result image interception operation in step S420 is performed, so that effectively avoid the content-free region in the final generated result image is effectively avoided.

Further, in the case of shooting in a rolling shutter mode, when the motion is particularly intense, the rolling shutter effect correction process may further cause the content-free region to appear in the region of interest. Therefore, when at least part of the region of interest is not covered by the correction image of the current frame, and the virtual posture calculated in step S200 is the same as the actual posture, that is, path smoothing is not actually performed, the rolling shutter effect correction process is further performed again by gradually reducing the value of the correction parameter k in step S426 and returning to step S412 until the current correction image generated by the transformation can completely cover the region of interest, so that the content-free region in the final generated result image is avoided.

The above anti-shake image processing method uses the G-sensor and/or gyro-sensor inside the imaging device to obtain the actual posture of the imaging device, then smoothly compensates the actual posture of the imaging device to obtain the virtual posture, and corrects the captured original image to the smooth compensated virtual posture, so as to achieve the purpose of making the captured image stable. It has the advantages of low cost, high efficiency and stable correction effect. Further, the anti-shake image processing method of the disclosure can also be combined with the optical image stabilization technology to further improve the stabilization effect.

For the video captured by the imaging device of CMOS sensor exposed by rolling shutter mode, some embodiments of the disclosure further propose to correct the rolling shutter effect of the image by using, the virtual posture after smooth compensation, and compensate the shake caused by long exposure time. The anti-shake image processing method of the embodiment of the disclosure can be widely used in various types of electronic devices.

In order to transform the image, theoretically, it is necessary to perform the transformation in steps S300 and S400 above for each pixel in the original image. However, such a transformation for each pixel will lead to high computational complexity. Therefore, in practical application, the original image grid representing the information of the original image can be generated according to the original image size, and each grid point in the original image grid corresponds to a pixel in the original image respectively. Thus, the original image grid can be used to replace the original image to perform the transformation of subsequent steps S300 and S400, and after S400 generates the result image grid corresponding to the result image, the mapping and interpolation processing can be performed on the original image using the result image grid to obtain the result image, so as to effectively reduce the amount of operation in the operation process.

In order to make the scheme of performing the anti-shake image processing method using the grid clearer, the scheme of performing the anti-shake image processing method using the grid is described in detail in the following steps S100-S200 and S500-S800. However, it should be understood that the following embodiments are for illustrative purposes only, and the foregoing steps S100-S400 correspond to the following steps S100-S200 and S500-S800. Therefore, except as otherwise described below, the above description of the foregoing steps S100-S400 can be applied to the following steps S100-S200 and S500-S800 in the same way. The present disclosure aims to cover the following steps S100-S200 and S500-S800 as optional specific embodiments of the above steps S100-S400 within the protection scope of the above steps S100-S400, and should not exclude steps S100-S200 and S500-S800 from the protection scope of the above steps S100-S400.

Figure 7:
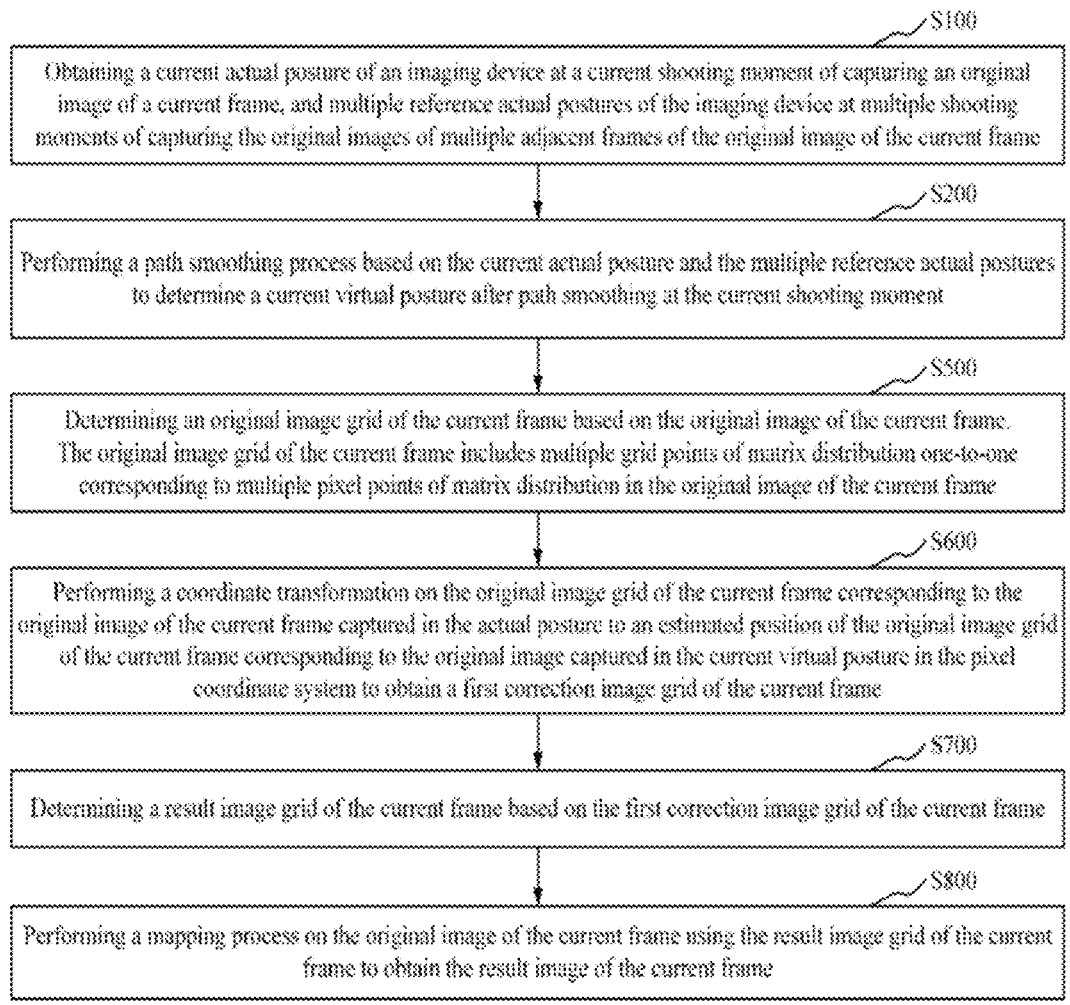
FIG. 7 is a flowchart of the anti-shake image processing method in one embodiment.

In one embodiment, as shown in FIG. 7, an anti-shake image processing method is provided. Taking the execution of the method by the electronic device 10 in FIG. 1 as an example, it includes the following steps S100-S200 and S500-S800.

Step S100: obtaining a current actual posture of an imaging device at a current shooting moment of capturing an original image of a current frame, and multiple reference actual postures of the imaging device at multiple shooting moments of capturing the original images of multiple adjacent frames of the original image of the current frame.

Step S200: performing a path smoothing process based on the current actual posture and the multiple reference actual postures to determine a current virtual posture after path smoothing at the current shooting moment.

Step S500: determining an original image grid of the current frame based on the original image of the current frame. The original image grid of the current frame includes multiple grid points of matrix distribution one-to-one corresponding to multiple pixel points of matrix distribution in the original image of the current frame.

Figures 8A, 8B:
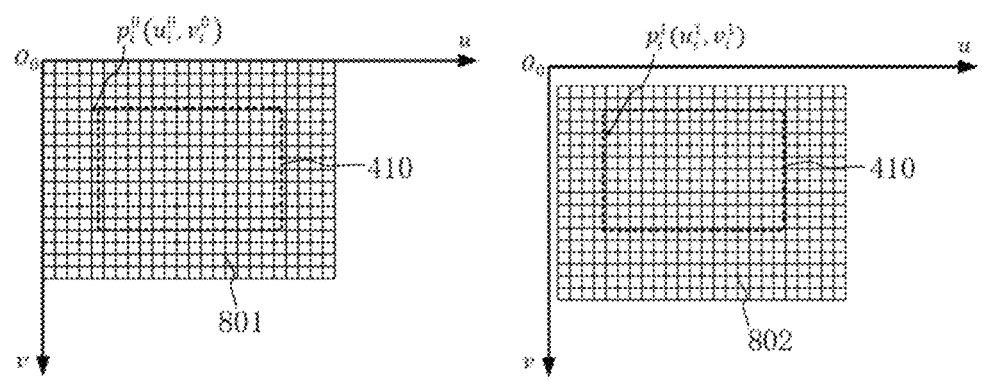
FIGS. 8A-8D are schematic diagrams of the change from the original image grid to the result image grid during the execution of the anti-shake image processing method in one embodiment.

Referring to FIG. 8A, an original image grid 801 corresponding to the original image 401 can be generated in this step. The boundary of the original image grid 801 coincides with the boundary of the original image 401. The size of each grid cell of the original image grid 801 is 1×1, the four corners of each grid cell have four grid points, and each grid point i in the original image grid corresponds to one pixel i in the original image respectively.

For a video shot in a rolling shutter mode, when it is necessary to perform rolling shutter effect correction by S7121-S7123, the grid cell side length l of the original image grid generated in this step can be the same as the width h of the sub image bar, so in step S7121, the first correction image grid can be easily divided along the edge of the grid cell in the direction of the u-axis to obtain multiple sub image bar grids.

Step S600: performing a coordinate transformation on the original image grid of the current frame corresponding to the original image of the current frame captured in the actual posture to an estimated position of the original image grid of the current frame corresponding to the original image captured in the current virtual posture in the pixel coordinate system to obtain a first correction image grid of the current frame.

Referring to FIG. 8B, in this step, a first correction image grid 802 corresponding to the first correction image 402 can be generated. After the coordinate transformation in this step, the obtained first corrected image grid 802 is offset relative to the original image grid 801 in the pixel coordinate system, and the pixel coordinates of the pixel point $p_i$ in the first corrected image grid 802 are transformed into $p_i^1(u_i^1, v_i^1)$.

Step S700: determining a result image grid of the current frame based on the first correction image grid of the current frame.

In one embodiment, step S700 includes step S710 and step S720.

Step S710: determining the correction image grid of the current frame based on the first correction image grid of the current frame.

Figure 9:
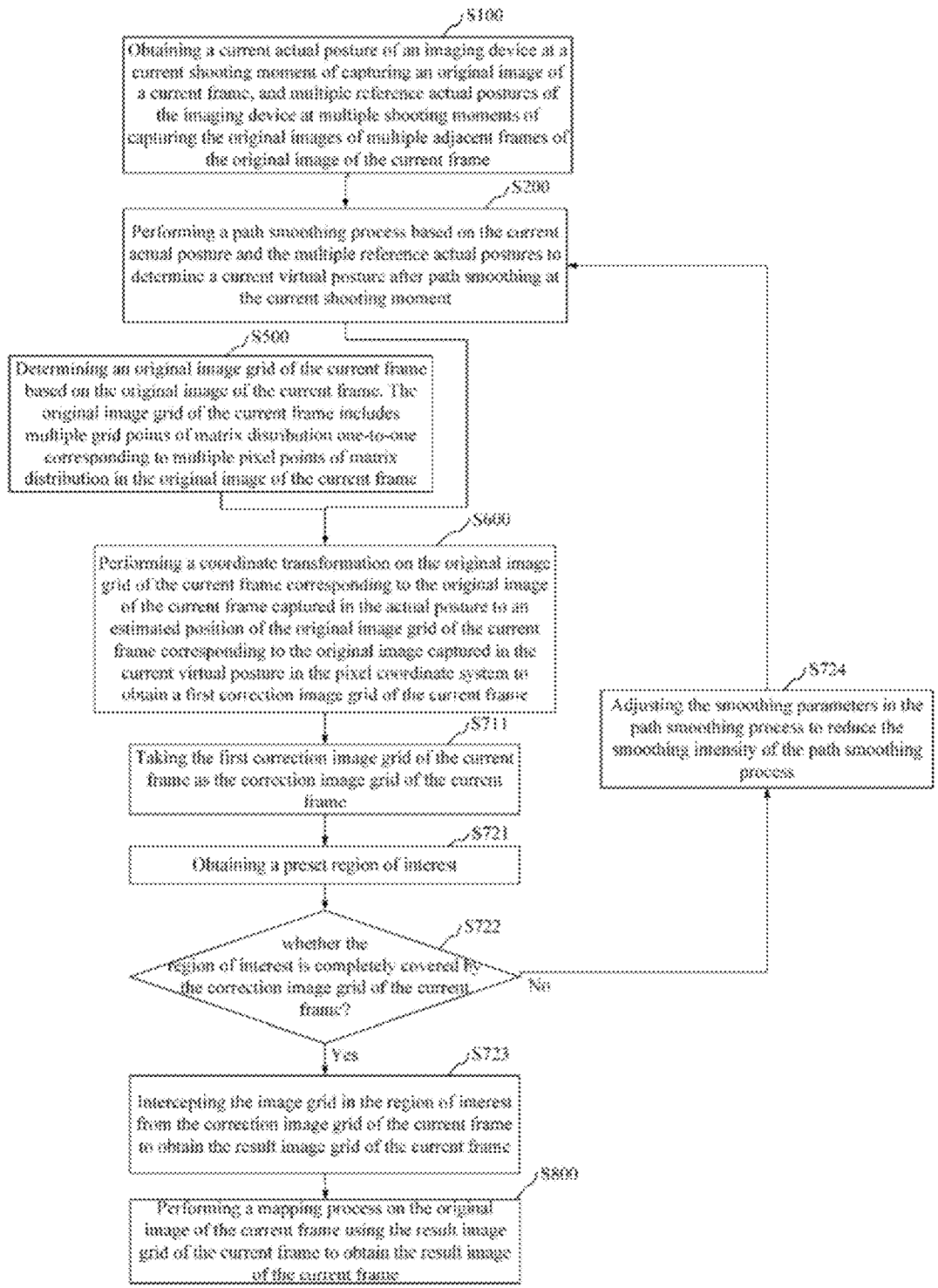
FIG. 9 is a flowchart of the anti-shake image processing method in one embodiment.

In one embodiment, as shown in FIG. 9, when the original image of the current frame is captured by the imaging device in the global shutter mode, step S710 includes step S711: taking the first correction image grid of the current frame as the correction image grid of the current frame.

Figure 10:
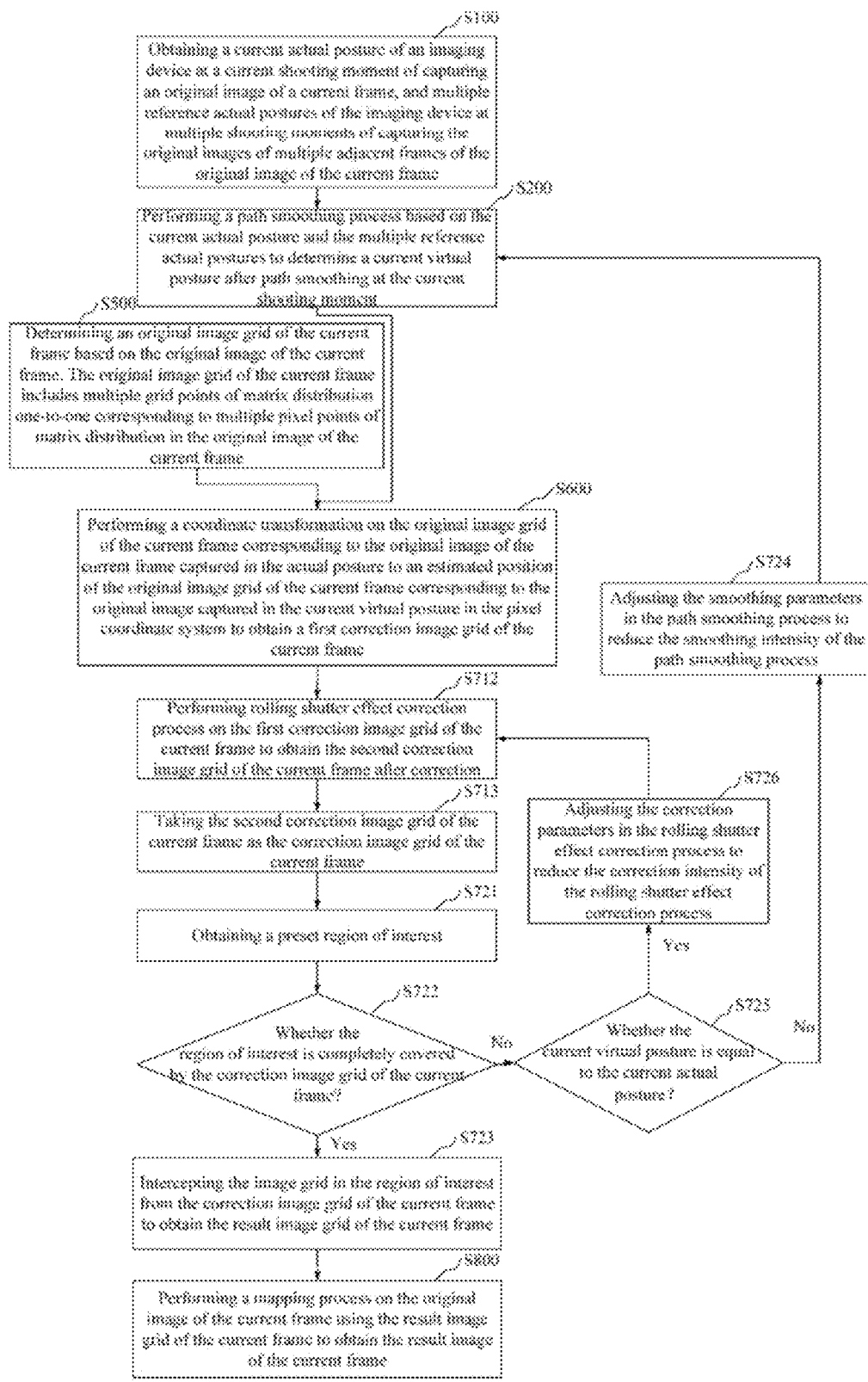
FIG. 10 is a flowchart of the anti-shake image processing method in one embodiment.

In another embodiment, as shown in FIG. 10, when the original image of the current frame is captured by the imaging device in the rolling shutter mode, step S710 includes steps S712-S713. Step S712: performing rolling shutter effect correction process on the first correction image grid of the current frame to obtain the second correction image grid of the current frame after correction. Step S713: taking the second correction image grid of the current frame as the correction image grid of the current frame.

In one embodiment, step S712 includes steps S7121-S7124.

Step S7121: dividing the first correction image grid of the current frame into multiple sub image bar grids parallel to the scanning pixel row of the roller shutter.

Step S7122: obtaining the actual posture of multiple sub images of the imaging device at the corresponding multiple imaging moments of the multiple of sub image bars corresponding to the multiple sub image bar grids.

Step S7123: performing a coordinate transformation on the multiple sub image bar grids corresponding to the multiple sub image bars captured in the multiple sub image actual posture to an estimated position of the multiple sub image bar grids corresponding to the multiple sub image bars captured in the current virtual posture in the pixel coordinate system to obtain multiple correction sub image bar grids.

Figures 8C, 8D:
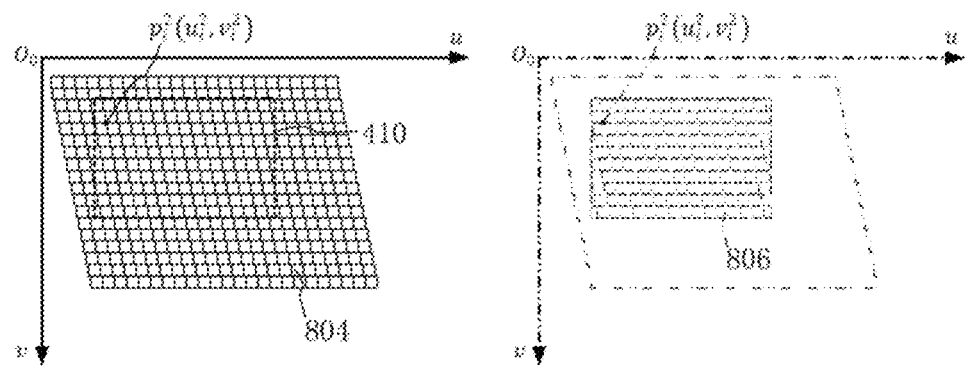

Referring to FIG. 8C, multiple correction sub image bar grids 804 corresponding to the multiple correction sub image bars 404 can be generated in this step. The multiple correction sub image bar grids 604 are offset relative to the sub image bar grid before correction in the pixel coordinate system, and the pixel coordinates of the pixel point $p_i$ in the multiple correction sub image bar grids 804 are transformed into $p_i^2(u_i^2, v_i^2)$.

Step S7124: obtaining a correction image grid of the current frame by combining multiple correction sub image bar grids.

Step S720: intercepting a region of interest from the correction image grid of the current frame to determine the result image grid of the current frame.

In one embodiment, as shown in FIG. 9 and FIG. 10, step S720 may include steps S721 to S723 regardless of whether the original image of the current frame is captured by the imaging device in a global shutter mode.

S721: obtaining a preset region of interest.

S722: determining whether the region of interest is completely covered by the correction image grid of the current frame.

When step S722 determines that the region of interest is completely covered by the correction image grid of the current frame, step S723 is executed to intercept the image grid in the region of interest from the correction image grid of the current frame to obtain the result image grid of the current frame.

Referring to FIG. 8D, the result image grid 806 corresponding to the result image 406 can be generated in this step.

In one embodiment, when the original image of the current frame is captured by the imaging device in a global shutter mode, as shown in FIG. 9, step S720 may further include the step as follows.

When step S722 determines that at least part of the region of interest is not covered by the correction image of the current frame, step S724 to is executed to adjust the smoothing parameters in the path smoothing process to reduce the smoothing intensity of the path smoothing process, and step S200 is returned to.

In another embodiment, when the original image of the current frame is captured by the imaging device in a rolling shutter mode, as shown in FIG. 10, step S720 further include the step as follows.

When step S722 determines that at least part of the region of interest is not covered by the correction image of the current frame, step S725 to is executed to determine whether the current virtual posture calculated in the recently executed step S200 is equal to the current actual posture.

When step S725 determines that the current virtual posture is not equal to the current actual posture, step S724 is executed to adjust the smoothing parameters in the path smoothing process to reduce the smoothing intensity of the path smoothing, process, and step S200 is returned to.

When step S725 determines that the current virtual posture is equal to the current actual posture, step S726 is executed to adjust the correction parameters in the rolling shutter effect correction process to reduce the correction intensity of the rolling shutter effect correction process, and step S712 is returned to.

Step S800: performing a mapping process on the original image of the current frame using the result image grid of the current frame to obtain the result image of the current frame.

Each grid point i in the result image grid 806 generated in step S722 has the information of the pixel coordinates $p_i^2(u_i^2, v_i^2)$ after the transformation of the corresponding, pixel $p_i$, and the original pixel coordinates $p_i^0(u_i^0, v_i^0)$ before the transformation of the corresponding pixel $p_i$ is known, so that the mapping relationship from $p_i^0(u_i^0, v_i^0)$ to $p_i^2(u_i^2, v_i^2)$ of the pixel points at each grid point in the result image grid 806 can be obtained. Then linear interpolation or bilinear interpolation is performed by using the mapping relationship of the four grid points at the four corners of each grid cell to obtain the mapping relationship of other pixels in the grid cell. Using the mapping relationship of each pixel obtained, the mapping process is performed on the original image of the current frame, and each corresponding pixel in the original image is transformed from to $p_i^0(u_i^0, v_i^0)$ to $p_i^2(u_i^2, v_i^2)$, so as to obtain the result image 406.

In this embodiment, the specific limitation of the anti-shake image processing method shown in FIGS. 7, 9 and 10 can be referred to the specific limitation of the anti-shake image processing method shown in FIGS. 2, 5 and 6, and will not be repeated again.

It should be understood that although the steps in the flowchart of FIGS. 2, 5, 6, 7, 9 and 10 are shown in turn according to the arrow, these steps are not necessarily performed in turn according to the arrow. Unless explicitly stated in the specification, there is no strict sequence restriction on the execution of these steps, and these steps can be executed in other sequences. Moreover, at least part of the steps in FIGS. 2, 5, 6, 7, 9 and 10 may include multiple sub steps or stages. These sub steps or stages are not necessarily executed at the same time, but can be executed at different times, and the execution sequence of these sub steps or stages is not necessarily sequential. Instead, these sub steps or stages can be executed in turn or alternately with other steps or at least part of sub steps or stages of other steps.

Figure 11:
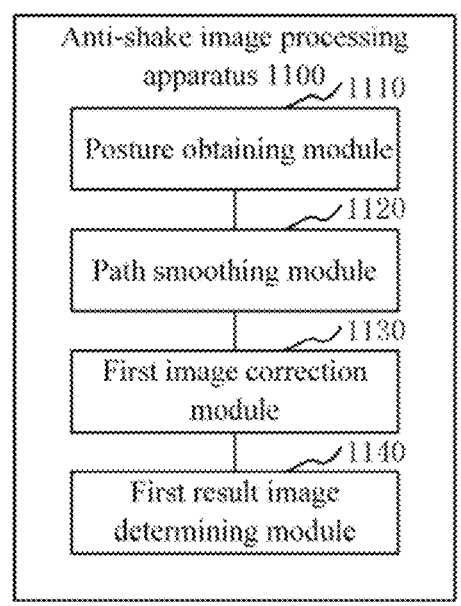
FIG. 11 is a structural block diagram of the anti-shake image processing apparatus in one embodiment.

In one embodiment, as shown in FIG. 11, an anti-shake image processing apparatus 1100 is provided, which include the following modules.

A posture obtaining module 1110 is configured to obtain a current actual posture of an imaging device at a current shooting moment of capturing an original image of a current frame, and multiple reference actual postures of the imaging device at multiple shooting moments of capturing the original images of multiple adjacent frames of the original image of the current frame.

A path smoothing module 1120 is con-figured to perform a path smoothing process based on the current actual posture and the multiple reference actual postures to determine a current virtual posture alter path smoothing at the current shooting moment.

A first image correction module 1130 is configured to perform a coordinate transformation on the original image of the current frame captured in the current actual posture to an estimated position of the original image of the current frame when captured in the current virtual posture in a pixel coordinate system to obtain a first correction image of the current frame.

A first result image determining module 1140 is configured to determine a result image of the current frame based on the first correction image of the current frame.

In one embodiment, an anti-shake image processing apparatus 1100 is provided, which include the following modules.

A posture obtaining module 1110 is configured to obtain a current actual posture at an imaging device at a current shooting moment of capturing an original image of a current frame, and multiple reference actual postures of the imaging device at multiple shooting moments of capturing the original images of multiple adjacent frames of the original image of the current frame.

A path smoothing module 1120 is configured to perform a path smoothing process based on the current actual posture and the multiple reference actual postures to determine a current virtual posture after path smoothing at the current shooting moment.

An original grid generation module 1150 is configured to determine an original image grid of the current frame based on the original image of the current frame. The original image grid of the current frame includes multiple grid points of matrix distribution one-to-one corresponding to a plurality of pixel points of matrix distribution in the original image of the current frame.

A second image correction module 1160 is configured to perform a coordinate transformation on the original image grid of the current frame corresponding to the original image of the current frame captured in the actual posture to an estimated position of the original image grid of the current frame corresponding to the original image captured in the current virtual posture in the pixel coordinate system to obtain a first correction image grid of the current frame.

A result image grid determination module 1170 is configured to determine a result image grid of the current frame based on the first correction image grid of the current frame.

A second result image determination module 1180 is configured to perform a mapping process on the original image of the current frame using the result image grid of the current frame to obtain the result image of the current frame.

For the specific limitation of the anti-shake image processing apparatus 1100, reference can be made to the above limitation of the anti-shake image processing, method, which will not be repeated here. Each module in the anti-shake image processing apparatus 1100 can be realized in whole or in part by software, hardware and their combinations. The above modules can be embedded in or independent of the processor in the electronic device in the form of hardware, or stored in the memory in the electronic device in the form of software, so that the processor can call and execute the corresponding operations of the above modules.

Figure 12:
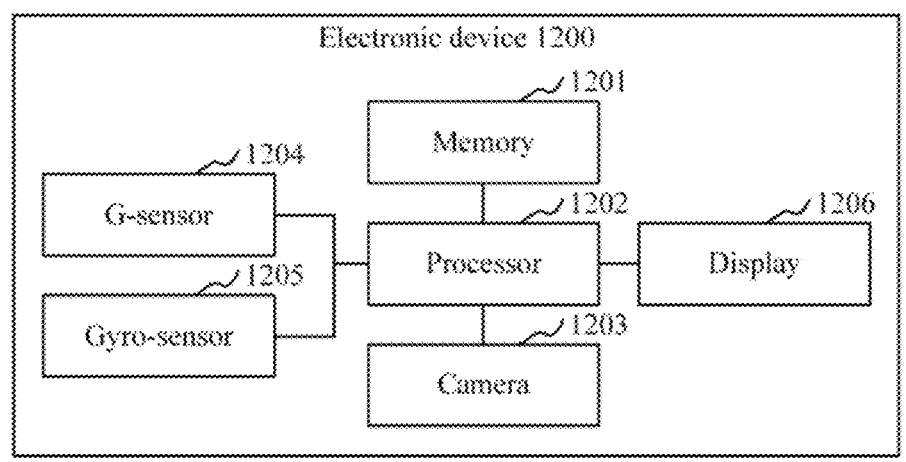
FIG. 12 is a structural diagram of the electronic device in one embodiment.

In one embodiment, as shown in FIG. 12, an electronic device 1200 is provided. The electronic device includes a memory 1201 and a processor 1202. The memory 1201 is connected with the processor 1202. A computer program is stored on the memory 1201. The processor 1202, when executing the computer program, implements the following steps.

A current actual posture of an imaging device at a current shooting moment of capturing an original image of a current frame is obtained. Multiple reference actual postures of the imaging device at multiple shooting moments of capturing the original images of adjacent multiple frames of the original image of the current frame are obtained.

A path smoothing process is performed based on the current actual posture and the multiple reference actual postures to determine a current virtual posture after path smoothing at the current shooting moment.

A coordinate transformation is performed on the original image of the current frame captured in the current actual posture to an estimated position of the original image of the current frame when captured in the current virtual posture in a pixel coordinate system to obtain a first correction image of the current frame.

A result image of the current frame is determined based on the first correction image of the current frame.

In one embodiment, as shown in FIG. 12, the electronic device 1200 may further include a camera 1203, which is connected with the processor 1202. The camera 1203 is configured to capture the original image and transmit the original image to the processor 1202. The processor 1202 receives the original image from the camera 1203.

In one embodiment, as shown in FIG. 12, the electronic device 1200 may further include a G-sensor 1204 and or a gyro-sensor 1205. The G-sensor 1204 and/or the gyro-sensor 1205 are connected with the processor 1202. The G-sensor 1204 and/or the gyro-sensor 1205 are configured to detect the actual posture of the electronic device 1200 while capturing the original image, and transmit the detected actual posture to the processor 1202. The processor 1202 receives the actual posture from the G-sensor 1204 and/or the gyro-sensor 1205.

In one embodiment, as shown in FIG. 12, the electronic device 1200 may further include a display 1206, which is connected with the processor 1202. When the processor 1202 executes the computer program, it further controls the display 1206 to display the result image.

In other embodiments, the processor 1202 further realizes the steps of the image distortion correction method of the above embodiments of the disclosure when executing the computer program, and has corresponding beneficial effects.

In other embodiments, a computer readable storage medium having stored thereon a computer program is provided. The computer program, when executed by a processor, implements the steps as follows.

A current actual posture of an imaging device at a current shooting moment of capturing an original image of a current frame is obtained. Multiple reference actual postures of the imaging device at multiple shooting moments of capturing the original images of adjacent multiple frames of the original image of the current frame are obtained.

A path smoothing process is performed based on the current actual posture and the multiple reference actual postures to determine a current virtual posture after path smoothing at the current shooting moment.

A coordinate transformation is performed on the original image of the current frame captured in the current actual posture to an estimated position of the original image of the current frame when captured in the current virtual posture in a pixel coordinate system to obtain a first correction image of the current frame.

A result image of the current frame is determined based on the first correction image of the current frame.

In other embodiments, when the computer program is executed by the processor, the steps of the anti-shake innate processing method of the above embodiments of the disclosure are also realized, and have corresponding beneficial effects.

A person of ordinary skill in the art would understand that all or part of the processes of the method in the foregoing embodiments may be implemented by a computer program instructing relevant hardware. The computer program may be stored in a non-volatile computer readable storage medium. When the computer program is executed, the computer program may include the processes of the embodiments of the above method. Any reference to memory, storage, database or other media used in the embodiments provided by the present disclosure may include non-volatile and/or volatile memory. Non-volatile memory may include read-only memory (ROM), programmable ROM (PROM), electrically programmable ROM (PROM), electrically erasable programmable ROM (EEPROM), or flash memory. Volatile memory may include random access memory (RAM) or external cache memory. As an illustration and not a limitation, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (Synchlink SLDRAM), rambus direct RAM (RDRAM), direct rambus dynamic RAM (DRDRAM), and rambus dynamic RAM (RDRAM), and so on.

The technical features of the above embodiments can be combined arbitrarily. In order to make the description concise, all possible combinations of the technical features in the above embodiments are not described. However, as long as there is no contradiction in the combination of these technical features, it shall be considered to be the scope recorded in the specification.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the inventive concept, which all belong to the scope of protection of the present disclosure. Therefore, the scope of protection of the present disclosure shall be subject to the appended claims.

What is claimed is:

1. An anti-shake image processing method, comprising:
    obtaining a current actual posture of aging device at a current shooting moment of capturing an original image of a current frame, and a plurality of reference actual postures and/or reference virtual postures of the imaging device at a plurality of shooting moments of capturing the original images of a plurality of adjacent frames of the original image of the current frame;
    performing a path smoothing process based on the current actual posture, the plurality of reference actual postures and/or reference virtual postures to determine a current virtual posture after path smoothing at the current shooting moment;
    performing a coordinate transformation on the original image of the current frame captured in the current actual posture to an estimated position of the original image of the current frame when captured in the current virtual posture in a pixel coordinate system to obtain a first correction image of the current frame; and
    determining a result image of the current frame based on the first correction image of the current frame.

2. The method of claim 1, wherein the step of determining a result image of the current frame based on the first correction image of the current frame comprises:
    determining a correction image of the current frame based on the first correction image of the current frame; and
    intercepting an image in a region of interest from the correction image of the current frame and cut off an edge part to remove a content-free region of the edge to determine the result image of the current frame.

3. The method of claim 2, wherein when the original image of the current frame is captured by the imaging device in a global shutter mode, the step of determining a correction image of the current frame based on the first correction image of the current frame comprises: taking the first correction image of the current frame as the correction image of the current frame; or
    when the original image of the current frame is captured by the imaging device in a rolling shutter mode, the step of determining a correction image of the current frame based on the first correction image of the current frame comprises: performing a rolling shutter effect correction process on the first correction image of the current frame to obtain a corrected second correction image of the current frame, and taking the second correction image of the current frame as the correction image of the current frame.

4. The method of claim 3, wherein the step of performing a rolling shutter effect correction process on the first correction image of the current frame to obtain a corrected second correction image of the current frame comprises:
    dividing the first correction image of the current frame into a plurality of sub image bars parallel to a scanning pixel row of the rolling shutter;
    obtaining a plurality of sub image actual postures of the imaging device when imaging a plurality of corresponding imaging moments of the plurality of sub image bars;
    performing a coordinate transformation on the plurality of sub image bars captured in the plurality of sub image actual postures to the estimated position of the plurality of sub image bars when captured in the current virtual posture in the pixel coordinate system to obtain a plurality of correction sub image bars; and
    combining the plurality of correction sub image bars to obtain the corrected second correction image of the current frame.

5. The method of claim 4, wherein the step of intercepting an image in a region of interest from the correction image of the current frame to determine the result image of the current frame comprises:
    obtaining a preset region of interest; and
    intercepting an image in the region of interest from the correction image of the current frame when the region of interest is completely covered by the correction image of the current frame to obtain the result image of the current frame.

6. The method of claim 5, wherein when the original image of the current frame is captured by the imaging device in a global shutter mode, the step of intercepting an image in a region of interest from the correction image of the current frame to determine the result image of the current frame comprises:
    adjusting smoothing parameters in the path smoothing process to reduce a smoothing intensity of the path smoothing process, and returning to the step of performing a path smoothing process based on the current actual posture and the plurality of reference actual postures to determine a current virtual posture after path smoothing at the current shooting moment when at least part of the region of interest is not covered by the correction image of the current frame.

7. The method of claim 5, wherein when the original image of the current frame is captured by the imaging device in a rolling shutter mode, the step of intercepting an image m a region of interest from the correction image of the current frame to determine the result image of the current frame comprises:
    adjusting smoothing parameters in the path smoothing process to reduce a smoothing intensity of the path smoothing process, and returning to the step of performing a path smoothing process based on the current actual posture and the plurality of reference actual postures to determine a current virtual posture after path smoothing at the current shooting moment when at least part of the region of interest is not covered by the correction image of the current frame and when the current virtual posture is not equal to the current actual posture; and
    adjusting correction parameters in the rolling shutter effect correction process to reduce a correction intensity of the rolling shutter effect correction process, and returning to the step of performing a rolling shutter effect correction process on the first correction image of the current frame to obtain a corrected second correction image of the current frame when at least part of the region of interest is not covered by the correction image of the current frame and when the current virtual posture is equal to the current actual posture.

8. The method of claim 1, wherein the step of performing a coordinate transformation on the plurality of sub image bars captured in the actual posture of the plurality of sub images to the estimated position of the plurality of sub image bars when captured in the current virtual posture in the pixel coordinate system to obtain a plurality of correction sub image bars and the step of determining a result image of the current frame based on the first correction image of the current frame comprise:

- determining an original image grid of the current frame based on the original image of the current frame; wherein the original image grid of the current frame comprises a plurality of grid points of matrix distribution one-to-one corresponding to a plurality of pixel points of matrix distribution in the original image of the current frame;
- performing a coordinate transformation on the original image grid of the current frame corresponding to the original image of the current frame captured in the actual posture to an estimated position of the original image grid of the current frame corresponding to the original image captured in the current virtual posture in the pixel coordinate system to obtain a first correction image grid of the current frame;
- determining a result image grid of the current frame based on the first correction mage grid of the current frame; and
- performing a mapping process on the original image of the current frame using the result image grid of the current frame to obtain the result image of the current frame.

9. An electronic device, comprising a memory on which a computer program stored and a processor, wherein the processor, when executing the computer program, implements the steps of the method of any of the claim 1.

10. A non-transitory computer readable storage medium having stored thereon a computer program, wherein the computer program, when executed by a processor, implements the steps of the method of any of the claim 1.

11. An anti-shake image processing apparatus, comprising:

- a posture obtaining module, configured to obtain a current actual posture of an imaging device at a current shooting moment of capturing an original image of a current frame, and a plurality of reference actual postures of the imaging device at a plurality of shooting moments of capturing the original images of a plurality of adjacent frames of the original image of the current frame;
- a path smoothing module, configured to perform a path smoothing process based on the current actual posture and the plurality of reference actual postures to determine a current virtual posture after path smoothing at the current shooting moment;
- a first image correction module, configured to perform a coordinate transformation on the original image of the current frame captured in the current actual posture to an estimated position of the original image of the current frame when captured in the current virtual posture in a pixel coordinate system to obtain a first correction image of the current frame; and
- a first result image determining module, configured to determine a result image of the current frame based on the first correction image of the current frame.

* * * * *